Sept. 11, 1956     L. W. PETERSEN     2,762,429
APPARATUS FOR CONCENTRATING HEAT SENSITIVE LIQUIDS
Filed Nov. 16, 1951
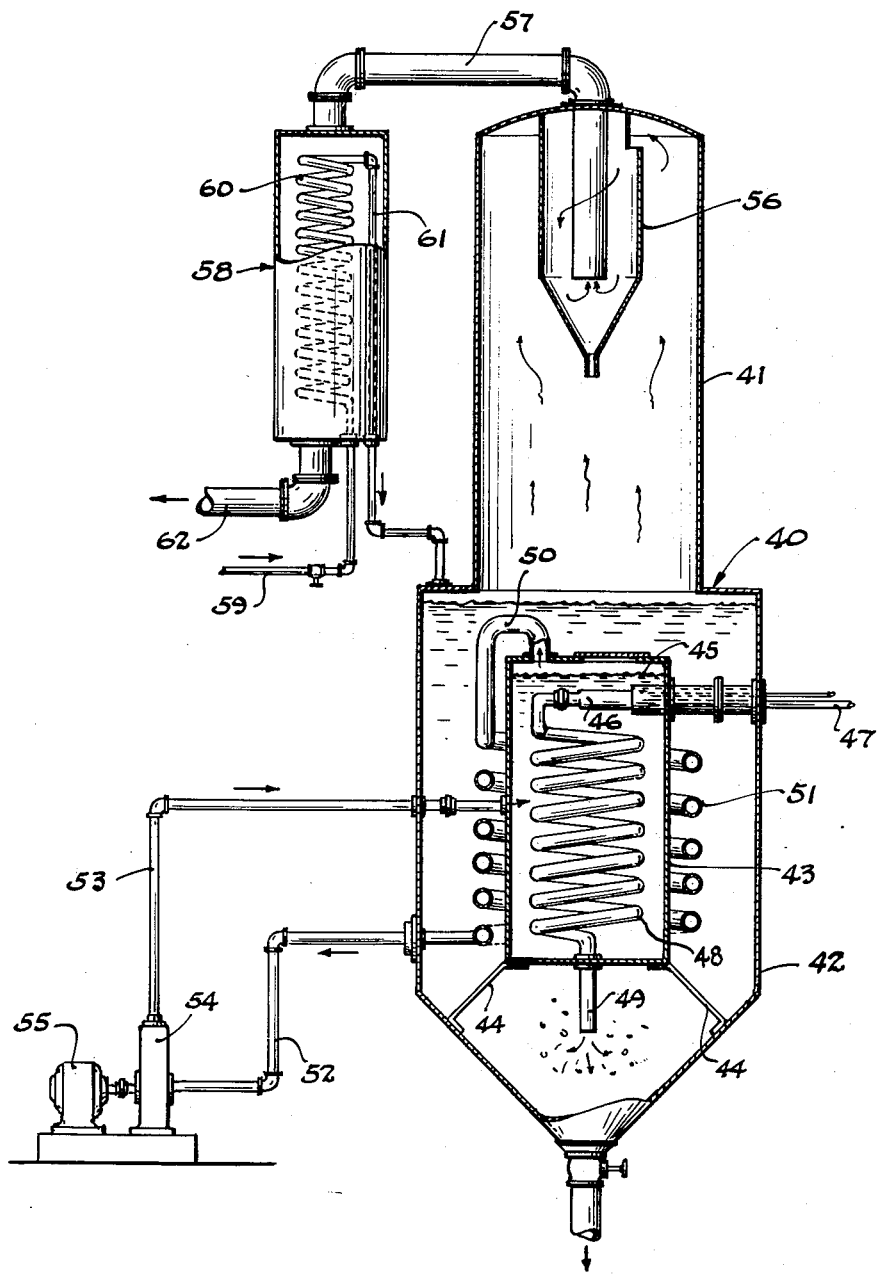
INVENTOR.
Lowell W. Petersen
BY
R. G. Story
ATTORNEY United States Patent Office 2,762,429
Patented Sept. 11, 1956

2,762,429

APPARATUS FOR CONCENTRATING HEAT SENSITIVE LIQUIDS

Lowell W. Petersen, Homewood, Ill., assignor to Swift & Company, Chicago, Ill., a corporation of Illinois Application November 16, 1951, Serial No. 256,680

1 Claim. (Cl. 159—16)

This invention relates to apparatus for the concentration of charrable organic liquids, and more particularly to apparatus for cooling hot combustion gases to a noncharring temperature through the vaporization of a condensible fluid maintained below the surface of the liquid to be concentrated.

The concentration of organic liquids in the past has generally been carried out through the use of jacketed vessels of various types wherein the heating medium was separated from the liquid to be concentrated by metal walls or the like. The principal reason for this has been the difficulty encountered in the prevention of charring or burning of the organic liquids when direct contact of the heating gases with the liquid was provided. It is well known that direct gas contact with the liquid to be concentrated is a more effective means of heat transfer resulting in partial pressure evaporating conditions which produce lower boiling temperatures. In addition, the bubbling of the gases through the liquid provides agitation thereof with a further gain in efficiency of heating. This direct contact combustion gas type of concentration is widely used in the evaporation and concentration of inorganic liquids. However, the problem with respect to the concentration of organic liquids is much more difficult. Organic liquids, such as milk, whey, and the like, are extremely heat-sensitive and direct contact of hot combustion gases with such liquids has in the past resulted in considerable charring and burning of the material being concentrated. For example, when whey is being concentrated for use in animal foods, the resulting product of a direct contact combustion gas evaporation is of a blackish-brown color due to charring rather than of the desirable light brown, tan or cream color of concentrated whey made by the less efficient evaporating and concentrating methods. In contrast to these difficulties of charring and the like, the increased efficiency and lower cost of a direct contact combustion gas concentration plant made it very desirable from the standpoint of economy that some means be devised to permit the used of direct contact combustion gas concentration in the concentration of charrable organic liquids.

Therefore, it is an object of the present invention to provide apparatus for the concentration of organic liquids by direct contact with combustion gases without appreciable charring taking place.

It is another object of this invention to provide apparatus for cooling hot combustion gases prior to direct introduction thereof into a charrable organic liquid being concentrated.

An additional object of this invention is to provide apparatus for carrying out the introduction of partially cooled combustion gases into a charrable organic liquid being concentrated whereby the said liquid is not affected by charring.

It is a further object of the invention to provide apparatus for cooling hot combustion gases prior to direct contact thereof with a charrable organic liquid to be concentrated, utilizing the heat of vaporization of a noncharrable, condensible fluid for such cooling.

Additional objects, if not specifically set forth herein, will be readily apparent to one skilled in the art from the following detailed description of the invention:

In the drawing:

The drawing is a partially-sectioned, front elevation of the apparatus of the present invention.

Generally, the present invention resides in the provision of apparatus for cooling down hot combustion gases, prior to contact thereof with the liquid to be concentrated, to a sufficiently low temperature to prevent charring of the organic liquid being concentrated upon contact therewith of said gases.

More particularly, the present invention contemplates cooling hot combustion gases through the vaporization of a noncharrable, condensible fluid disposed below the liquid level of the charrable organic liquid to be concentrated, but not in direct contact therewith. According to the present invention, the hot gases cause such vaporization by the indirect heat exchange with the noncharrable, condensible fluid. The vaporization of the fluid takes place prior to direct contact of the combustion gases with the charrable liquid to be concentrated, thus decreasing the temperature of the hot gases by the amount of heat required to vaporize the condensible fluid. As will be more fully described below, this heat of vaporization is utilized in the manner hereinafter described as a second means of heating the charrable organic liquid to be concentrated.

Referring now to the drawing, the apparatus of the present invention is illustrated. The vaporization of the condensible fluid is carried out by indirect heat transfer. A conventional evaporator 40 having a vapor head space 41 and liquid-containing body portion 42 is provided. A fluid-containing chamber or pressure tank 43 is supported as by braces 44 below the liquid level within the body portion 42 of the evaporator. A hot gas, submerged combustion burner 46 is positioned below the level of the fluid 45 in the chamber 43, and supplied with fuel through line 47. The products of combustion, at a high temperature, pass into coil 48 which spirals downwardly within chamber 43. The hot gases transfer heat through the walls of coil 48 to the fluid 45, causing vaporization thereof. Cooled by this heat transfer, the gases pass through ports 49 into the body of charrable liquid to be concentrated. The vaporized fluid passes through line 50 into coil 51 disposed annularly about chamber 43 where its heat is transferred through the walls of coil 51 into the liquid to be concentrated causing condensation of the vaporized fluid. The condensed fluid passes through line 52 to pump 54. The condensate is returned to chamber 43 via line 53 and pump 54 operated by motor 55. The combustion gases bubbling through the liquid to be concentrated, pass up through vapor space 41 and into a cyclone separator 56 wherein separation of any entrained liquid from the gases takes place. This liquid is returned to the concentrating liquid and the gases pass out through stack 57 into a heat exchanger 58. Raw feed for the evaporator body is preheated by passage from line 59 through coils 60 located in the heat exchanger 58. The pre-heated feed is fed into the liquid-containing body portion 42 of evaporator 40 through feed line 61, while the gases pass off through exit stack 62. The pre-heater shown in the drawing may be advantageously used, although it is not essential to the operation of the present invention.

The temperature of the hot combustion gases leaving the combustion chamber will vary to a considerable extent depending on the fuel used. A typical gaseous fuel, such as a natural gas composed of approximately 82.8 per cent $CH_4$, 16.3 per cent $C_2H_6$, 0.8 percent illuminants, when mixed with 9 to 10 volumes of air will produce a temperature of about 1800° to 2800° F. in the combustion chamber, depending upon the air-gas ratio used. Using the present method, this temperature can be reduced to approximately 212° F. by the time the gases come into direct contact with the liquid to be concentrated.

As can be seen from the foregoing description, the apparatus of this invention successfully overcomes the disadvantages of the use of direct contact combustion gas concentration of charrable organic liquids, thereby opening up a new and more efficient field of concentrating such liquids to the industry. This invention is of particular valve to dairy, sugar, and other industries employed in concentrating solutions of organic origin. It is obvious that the invention could be used in the concentration of inorganic solutions, but its use would not be so advantageous in such fields since the problem of charring is usually not present in the concentration of most inorganic solutions.

The apparatus disclosed herein may be installed in the conventional evaporator shell, and hence a change-over to direct contact combustion gas concentration would not necessitate a great outlay for new equipment. Further, the apparatus of this invention takes up considerably less space than the conventional double and triple effect evaporators in common use today, and consequently will permit greater production from the same plant area than is now possible.

Obviously, many modifications and variations of the invention as hereinbefore set forth may be made without departing from the spirit and scope thereof, and therefore only such limitations should be imposed as are indicated in the appended claim:

I claim:
Apparatus for concentrating charrable organic liquids comprising: an evaporator shell having a vapor head space and a body portion adapted to contain a liquid to be concentrated; a chamber mounted within said body portion; means for supplying hot combustion gases; a coil disposed within said body portion exterior of said chamber and so connected to said chamber as to provide a continuous passage leading from and returning to said chamber; and a second coil disposed within said chamber, said second coil being connected at one end with said hot gas supply means, and the other end of said second coil opening into the body portion of said evaporator shell.

References Cited in the file of this patent
UNITED STATES PATENTS

| | | |
|---|---|---|
| 54,730 | Howell | May 15, 1866 |
| 478,736 | Cole | July 12, 1892 |
| 594,858 | Christopher | Dec. 7, 1897 |
| 683,281 | Hofmann | Sept. 24, 1901 |
| 953,682 | Benjamin | Apr. 5, 1910 |
| 1,013,635 | Bardill | Jan. 2, 1912 |
| 1,461,640 | Wirth-Frey | July 10, 1923 |
| 2,042,488 | Theiler | June 2, 1936 |
| 2,092,470 | Peebles | Sept. 7, 1937 |
| 2,334,563 | Lavine et al. | Nov. 16, 1943 |
| 2,538,412 | Cecil et al. | Jan. 16, 1951 |
| 2,579,203 | Putney | Dec. 18, 1951 |
| 2,594,063 | Norman | Apr. 22, 1952 |
| 2,632,505 | Petersen | Mar. 24, 1953 |
| 2,647,370 | Miller | Aug. 4, 1953 |
| 2,702,594 | Petersen | Feb. 22, 1955 |
| 2,704,120 | Petersen | Mar. 15, 1955 |

FOREIGN PATENTS

| | | |
|---|---|---|
| 10,911 of 1886 | Great Britain | Aug. 26, 1886 |